(12) United States Patent
Izawa et al.

(10) Patent No.: US 9,216,667 B1
(45) Date of Patent: Dec. 22, 2015

(54) VEHICLE SEAT

(71) Applicants: TS TECH CO., LTD., Asaka-shi, Saitama (JP); HONDA MOTOR CO., LTD., Tokyo (JP)

(72) Inventors: Hiroshi Izawa, Tochigi (JP); Makoto Takeuchi, Tochigi (JP); Akimitsu Kurihara, Tochigi (JP); Masaki Shimazu, Dublin, OH (US); Paul D. Nguyen, Hilliard, OH (US); Terrie Ellison, Hilliard, OH (US); Ronald C. Cozzo, Delaware, OH (US)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/480,824

(22) Filed: Sep. 9, 2014

(51) Int. Cl.
*B60N 2/16* (2006.01)

(52) U.S. Cl.
CPC . *B60N 2/16* (2013.01); *B60N 2/168* (2013.01)

(58) Field of Classification Search
CPC ................................. B60N 2/16; B60N 2/168
See application file for complete search history.

(56) References Cited

U.S. PATENT DOCUMENTS

| | | | | |
|---|---|---|---|---|
| 4,614,257 A * | 9/1986 | Harada | ................... | B60N 2/168 188/77 W |
| 7,472,963 B2 * | 1/2009 | Jeong | ................... | B60N 2/0296 297/463.1 |
| 7,938,490 B2 * | 5/2011 | Ishijima | ................ | B60N 2/0296 297/344.1 |
| 7,959,229 B2 * | 6/2011 | Ishijima | ................ | B60N 2/0296 297/337 |
| 8,353,561 B2 * | 1/2013 | Yamazaki | ................ | B60N 2/44 297/452.38 |
| 8,632,128 B2 * | 1/2014 | Omori | ....................... | B60N 2/12 297/341 |
| 8,807,507 B2 * | 8/2014 | Ito | ........................ | B60N 2/1615 248/421 |
| 8,936,318 B2 * | 1/2015 | Sasaki | ...................... | B60N 2/16 297/344.15 |
| 9,010,860 B2 * | 4/2015 | Kume | ...................... | B60N 2/44 297/344.1 |
| 9,022,477 B2 * | 5/2015 | Pleskot | .................... | B60N 2/06 297/361.1 |
| 2009/0026791 A1 * | 1/2009 | Ishijima | ............... | B60N 2/0296 296/65.18 |
| 2009/0058158 A1 * | 3/2009 | Sobieski | .............. | B60N 2/0296 297/338 |
| 2009/0184554 A1 * | 7/2009 | Paing | ..................... | B60N 2/168 297/358 |
| 2010/0109406 A1 * | 5/2010 | Ueda | ..................... | B60N 2/0296 297/358 |

(Continued)

FOREIGN PATENT DOCUMENTS

JP    2009-012548 A     1/2009
JP    5048883 B1 * 10/2012 ........... B60N 2/2213

*Primary Examiner* — Rodney Mintz
(74) *Attorney, Agent, or Firm* — Drinker Biddle & Reath LLP

(57) ABSTRACT

In a vehicle seat, a positional deviation of a height device for moving a seat main body up and down is suppressed. The vehicle seat includes a cushion frame serving as a frame of a seating portion; the height device for moving the cushion frame up and down; and a side cover that covers the cushion frame and the height device from outside in a seat width direction. An operation lever is positioned in a state of being engaged with a positioning member contained in an outer side surface of the side cover, and an engagement protrusion of the operation lever moves in an engagement hole of the positioning member and abuts on a first stepped portion and a second stepped portion provided around the engagement hole when the operation lever rotates.

9 Claims, 6 Drawing Sheets

(56) References Cited

U.S. PATENT DOCUMENTS

| | | | | |
|---|---|---|---|---|
| 2011/0006583 A1* | 1/2011 | Schwarze | B60N 2/206 | 297/463.1 |
| 2011/0148164 A1* | 6/2011 | Oori | B60N 2/12 | 297/344.1 |
| 2013/0088066 A1* | 4/2013 | Sasaki | B60N 2/16 | 297/452.38 |
| 2013/0119724 A1* | 5/2013 | Adachi | B60N 2/42745 | 297/216.14 |
| 2014/0183918 A1* | 7/2014 | Kaku | B60N 2/002 | 297/344.15 |
| 2014/0284989 A1* | 9/2014 | Nagura | B60N 2/235 | 297/463.1 |
| 2014/0300160 A1* | 10/2014 | Shigematsu | B60N 2/16 | 297/338 |
| 2014/0368009 A1* | 12/2014 | Haut | A47D 1/006 | 297/256.13 |
| 2015/0151653 A1* | 6/2015 | Furuta | B60N 2/68 | 297/344.15 |
| 2015/0158398 A1* | 6/2015 | Kim | B60N 2/22 | 297/344.12 |
| 2015/0210188 A1* | 7/2015 | Hoshi | B60N 2/68 | 297/344.12 |
| 2015/0231993 A1* | 8/2015 | Hoshi | B60N 2/1615 | 297/344.12 |
| 2015/0239370 A1* | 8/2015 | Hoshi | B23K 26/20 | 297/344.15 |

* cited by examiner

VEHICLE SEAT

BACKGROUND

Described herein is a vehicle seat and particularly a vehicle seat including a seat adjustment device for adjusting the state of a seat.

There are conventionally widely known vehicle seats each of which includes a height device that couples a seat cushion serving as a seating portion of a seat main body to a vehicle body floor side so that the seat cushion is movable up and down.

Generally, the height device includes a pair of front links attached between the seat cushion and the vehicle floor and is provided on a seat front side, and a pair of rear links attached between the seat cushion and the vehicle floor and is provided on a seat back side. The height device is configured to be able to adjust the height of the seat main body with one of the rear links acting as a drive link.

An operation lever operating the driving of the height device is attached to the outside of the drive link in a seat width direction, and a brake unit that restricts the driving of the height device is provided between the drive link and the operation lever (see, for example, Japanese Patent Application Laid-Open No. 2009-12548 (hereinafter, "Document '548")).

A vehicle seat described in Document '548 mainly includes a seat cushion, a lifter device corresponding to a height device, and a resin garnish covering the seat cushion and the lifter device from the outside in a seat width direction.

An operation lever and a brake unit of the lifter device are arranged at distant positions in a seat front to back direction, and power transmission means for transmitting power from the operation lever to the brake unit is constituted by a parallel four-joint link mechanism.

With the configuration described above, operability for an occupant operating the operation lever improves and the degree of freedom for the arrangement of the operation lever increases, thereby facilitating commoditizing the operation lever and the height device.

However, the vehicle seat including the height device has the following problems. At a time of assembling the height device into the vehicle seat, the position of the assembled height device is possibly deviated by the influence of dimensional tolerances, assembly tolerances, welding tolerances, and the like, of constituent components. Furthermore, the positional deviation of the operation lever possibly adversely influences the appearance of the seat.

Particularly in a case of the vehicle seat described in Document '548, the number of constituent components, such as the parallel four-joint link mechanism, increases despite the improvement in the operability of the operation lever, since the operation lever and the brake unit are arranged at the distant positions. As a result, the positional deviation of the height device tends to occur.

Demand, therefore, rises for a technique capable of facilitating positioning the height device (seat adjustment device) and suppressing the positional deviation thereof when the height device is assembled into the vehicle seat.

Moreover, it is important for the vehicle seat including the height device to provide a good operation feeling as well as the high operability for an occupant's operation of the operation lever. The vehicle seat as described in Document '548, however, is not designed to improve the operation feeling.

Demand, therefore, rises for a technique for improving the operation feeling for the operation lever of the height device (seat adjustment device).

SUMMARY

Various embodiments described herein consider the above-described problems, and an object of various embodiments is to provide a vehicle seat including a seat adjustment device for adjusting a state of a seat, facilitating positioning the seat adjustment device, and capable of suppressing the positional deviation of the seat adjustment device.

Another object is to provide a vehicle seat intended to improve an operation feeling for an operation lever of the seat adjustment device.

A vehicle seat according to an embodiment is a vehicle seat comprising: a cushion frame serving as a frame of a seating portion; a seat adjustment device for adjusting a state of the cushion frame; and a side cover that covers the cushion frame and the seat adjustment device from outside in a seat width direction, wherein the seat adjustment device comprises an operation lever that is attached to an outer side surface of the cushion frame in the seat width direction to be rotatable via a support shaft, is arranged to project outward of the side cover, and operates the cushion frame, a positioning member for positioning the operation lever is attached to an outer side surface of the side cover, the operation lever is arranged to rotate relative to the positioning member in a state in which an engagement portion provided on an inner side surface of the operation lever is engaged with an engagement portion provided on the positioning member, one of the engagement portions of the operation lever and the engagement portion of the positioning member is an engagement hole extending along a circular arc around the support shaft, and the other of the engagement portions is an engagement protrusion protruding toward the engagement hole and arranged to move in the engagement hole to correspond to rotation of the operation lever, a first stepped portion and a second stepped portion are formed around the engagement hole, the first stepped portion and the second stepped portion being provided such that a part of the engagement hole is formed narrower in a radial direction of the support shaft, the first stepped portion and the second stepped portion being arranged at different positions in an extension direction of the engagement hole, and a surface of at least one of the first stepped portion and the second stepped portion that abuts on the engagement protrusion is a substantially flat surface.

As described above, the operation lever of the seat adjustment device is positioned to the positioning member provided on the outer side surface of the side cover. Owing to this, when the seat adjustment device is assembled into the vehicle seat, it is possible to achieve the vehicle seat capable of suppressing the positional deviation of the operation lever.

Furthermore, the operation lever is arranged to rotate relative to the positioning member in the state of being engaged with the positioning member so that it is possible to further suppress the positional deviation of the operation lever.

Moreover, when the occupant rotates the operation lever, the abutment of the engagement protrusion on the stepped portion of the engagement hole produces a clicking feel so that the occupant's operation feeling improves.

Furthermore, the surface of at least one of the first stepped portion and the second stepped portion that abuts on the engagement protrusion is a substantially flat surface. It is, therefore, possible to reduce sliding resistance generated when the engagement protrusion abuts on the stepped portion of the engagement hole, and to improve the occupant's operation feeling.

According to an embodiment, it is preferable that the first stepped portion and the second stepped portion are provided around a central portion of the engagement hole in the extension direction of the engagement hole, and that surfaces of the first stepped portion and the second stepped portion that abut on the engagement protrusion are substantially flat surfaces.

With the above-described configuration, portions around the central portion in the extension direction of the engagement hole are generally more flexible than those around end portions thereof. Therefore, the operation feeling of the operation lever improves by providing the stepped portions around the central portion.

According to an embodiment, it is preferable that the engagement portion of the operation lever is provided to rotate about the support shaft in a rotation range to correspond to the rotation of the operation lever, and that it is positioned between the first stepped portion and the second stepped portion when being located at an intermediate position in the rotation range.

It is also preferable that the first stepped portion and the second stepped portion are provided such that the part of the engagement hole is narrower than the engagement protrusion in the radial direction of the support shaft, and that the engagement hole is provided continuously between the first stepped portion and the second stepped portion, is provided such that the part of the engagement hole is formed wider than portions in which the first stepped portion and the second stepped portion are located, and includes a central positioning portion that positions the engagement protrusion.

With the above-described configuration, when the occupant rotates the operation lever from the intermediate position in the rotation range, the engagement protrusion abuts on the stepped portion of the engagement hole to produce the clicking feel so that the operation feeling improves.

According to an embodiment, it is preferable that the portions of the positioning member in which the first stepped portion and the second stepped portion are formed are thinner as being closer to the central positioning portion side in the extension direction of the engagement hole.

With the above-described configuration, it is possible to reduce the sliding resistance generated when the engagement protrusion rotates in the engagement hole to move from the central positioning portion to stride (or be located) over the stepped portion so that the operation feeling improves.

According to an embodiment, it is preferable that surfaces of the first stepped portion and the second stepped portion that abut on the engagement protrusion are flat surfaces generally orthogonal to the radial direction of the support shaft.

It is also preferable that the first stepped portion and the second stepped portion are longer than portions of the engagement protrusion that abut on the first stepped portion and the second stepped portion in the extension direction of the engagement hole.

With the above-described configuration, it is possible to further reduce the sliding resistance generated when the engagement protrusion moves in the engagement hole when the operation lever is operated so that the operation feeling improves.

According to an embodiment, it is preferable that the positioning member is fan-shaped.

With the above-described configuration, it is possible to attach the positioning member in a compact manner.

According to an embodiment, it is preferable that the seat adjustment device is a height device that couples the cushion frame to the vehicle body floor side so that the cushion frame is movable up and down, the support shaft is a lever support shaft, the height device includes a brake unit that is attached to a side surface of the cushion frame to be rotatable via a brake rotational shaft, and that applies a resistance force against an up/down movement of the cushion frame, the lever support shaft and the brake rotational shaft are arranged at different positions in the seat front to back direction, and that the operation lever and the brake unit are coupled to operate in a corresponding manner.

In this way, in the structure in which the operation lever and the brake unit of the height device are arranged at distant positions, it is possible to suppress the positional deviation of the operation lever and secure the design of the overall seat.

BRIEF DESCRIPTION OF THE DRAWINGS

Various embodiments of the invention are illustrated in the following drawings, in which.

DETAILED DESCRIPTION

A vehicle seat according to an embodiment of the present invention will be described hereinafter with reference to FIGS. 1 to 6.

A vehicle seat according to the present embodiment is a vehicle seat in which an operation lever and a brake unit of a height device are arranged at distant positions, and characterized in that the operation lever is positioned in a state of being engaged with a positioning member contained in an outer side surface of a side cover that covers a cushion frame and the height device from outside in a seat width direction using the side cover, and in that an engagement protrusion of the operation lever moves in an engagement hole of the positioning member when the operation lever rotates and abuts on a first stepped portion and a second stepped portion provided around the engagement hole.

A side on which a seated person is seated against a seatback of the vehicle seat is defined as a front side.

Figure 1:
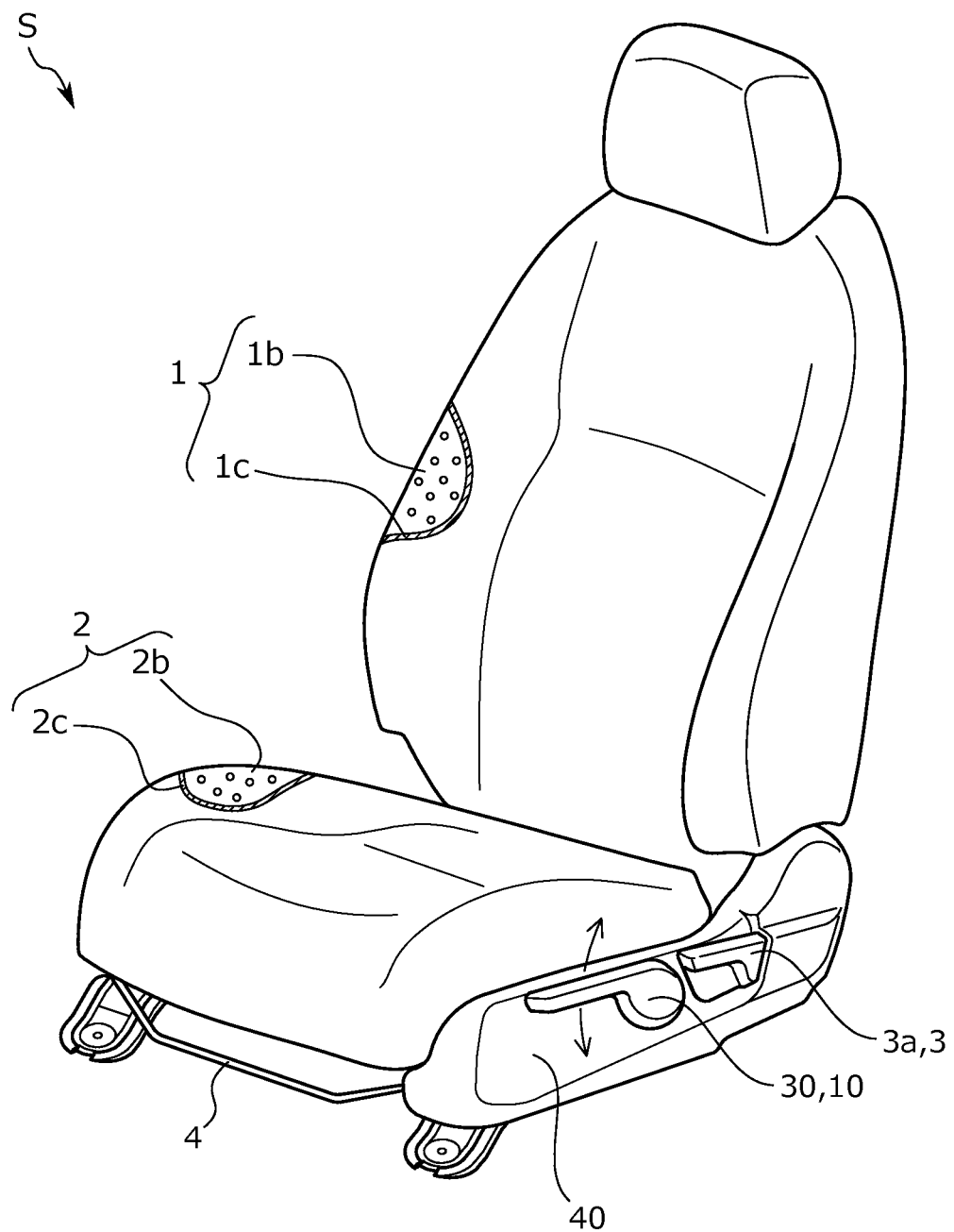
FIG. 1 is an external perspective view of a vehicle seat according to an embodiment of the present invention.

As shown in FIG. 1, a vehicle seat S according to the present embodiment mainly includes a seatback 1 serving as a backrest, a seat cushion 2 serving as a seating portion, a reclining device 3 rotatably coupling the seatback 1 to the seat cushion 2, a rail device 4 supporting a seat main body that includes the seatback 1 and the seat cushion 2 so that the seat main body is movable relative to a vehicle body floor in a seat front to back direction, and a height device 10 coupling the seat main body to the vehicle body floor so that the seat main body can move up and down.

Furthermore, a side cover 40 that protects the reclining device 3, the rail device 4, and the height device 10 from outside, is attached to outside of the seat cushion 2 in a seat width direction.

As shown in FIG. 1, the seatback 1 is constructed so that a cushion pad 1b is mounted on a back frame (not shown)

serving as a frame and that the back frame with the cushion pad 1b is covered with a skin material 1c.

Figure 2:
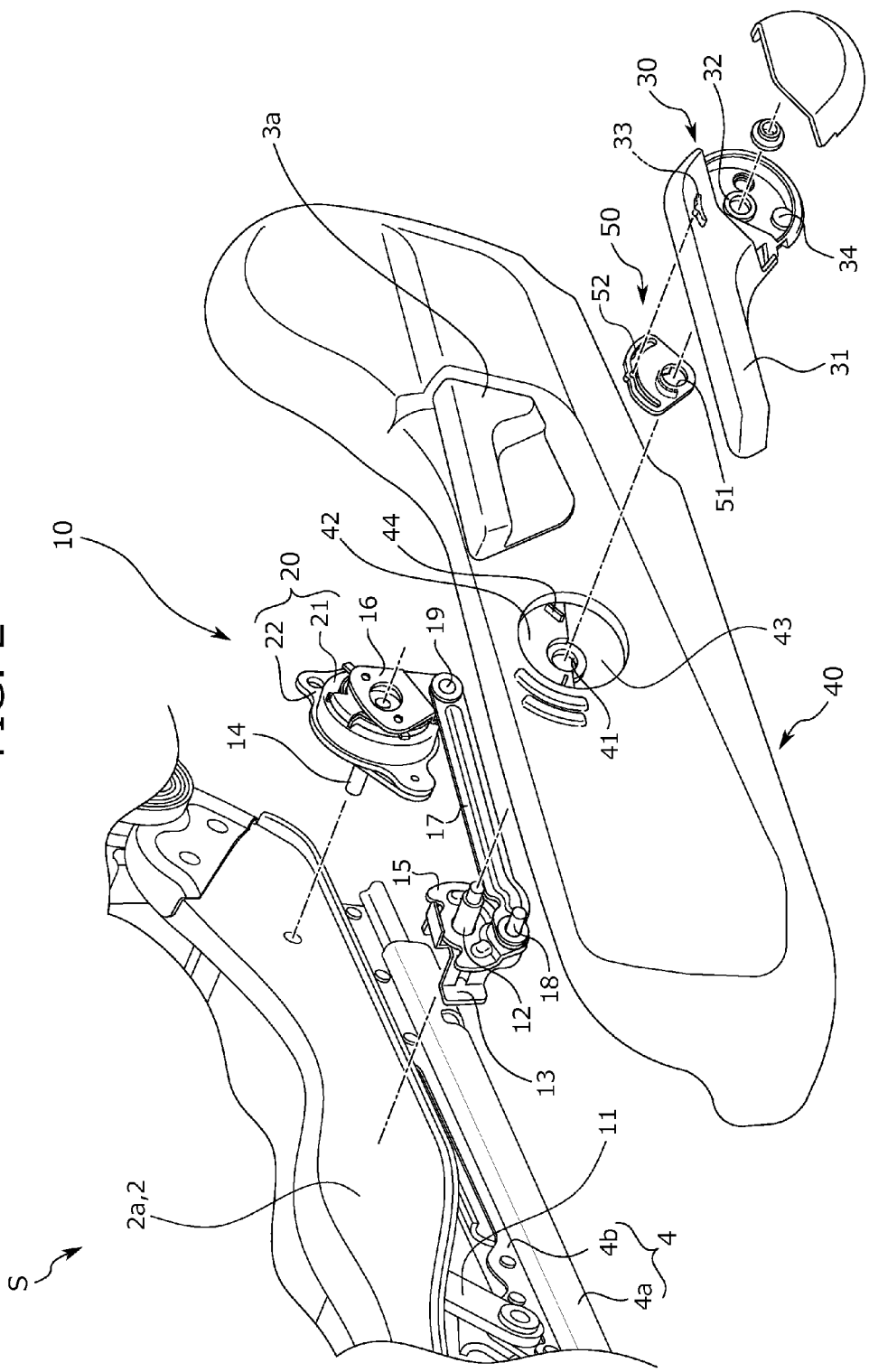
FIG. 2 is an enlarged view of principal components of FIG. 1 and is an exploded perspective view of components around a height device.

The seat cushion 2 is constructed so that a cushion pad 2b is mounted on a cushion frame 2a serving as a frame shown in FIG. 2 and that the cushion frame 2a with the cushion pad 2b is covered with a skin material 2c.

The reclining device 3 is a well-known device that can switch a state of the seatback 1 between a locked state in which a rotating operation of the seatback 1 is locked and, an unlocked state that unlocks the locked state in which the seatback 1 is locked in a standing attitude by operating an operation handle 3a, and that adjusts the standing attitude of the seatback 1.

As shown in FIG. 2, the rail device 4 is a well-known device that includes right and left lower rails 4a fixed to the vehicle body floor and extending in the seat front to back direction, and right and left upper rails 4b slidably supported along the respective lower rails 4a.

The cushion frame 2a is suspended over upper surfaces of the right and left upper rails 4b via the height device 10.

As shown in FIG. 2, the height device 10 includes a pair of front links 11 attached between the cushion frame 2a and the rail device 4 and arranged on a seat front side, and a pair of rear links (not shown) arranged on a seat back side. The height device 10 is a height link capable of adjusting a height of the seat main body with one of the rear links serving as a drive link.

In a coupled portion of the drive link near the cushion frame 2a side, a sector gear portion (not shown) serving as a gear is formed in a part of an outer peripheral portion and the sector gear portion is engaged with a pinion gear (not shown) provided inward of a brake unit 20, to be described later, in a right to left direction.

Figure 3:
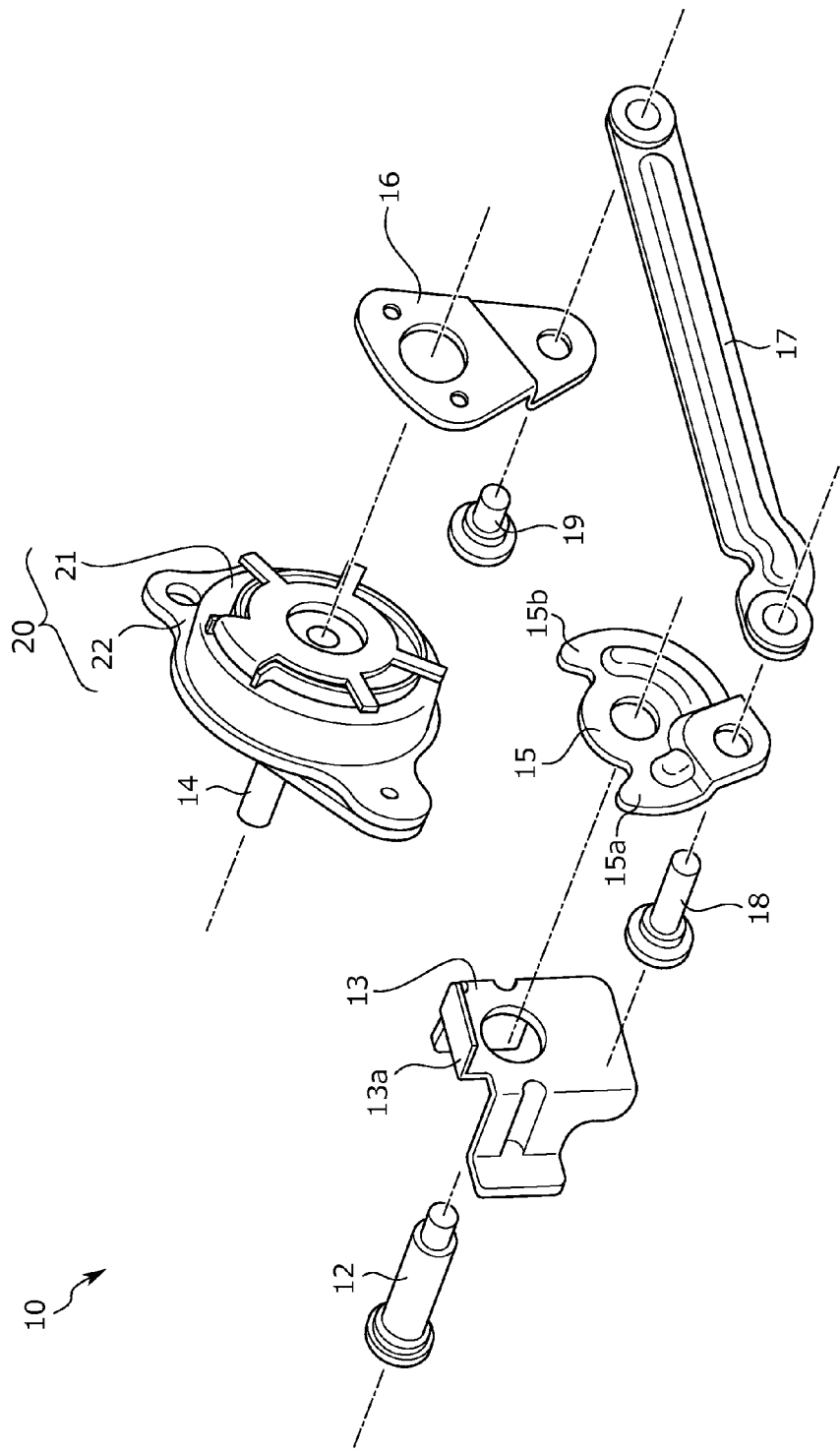
FIG. 3 is an exploded perspective view of a four-joint link mechanism that is a constituent component of the height device.

Furthermore, as shown in FIGS. 2 and 3, the height device 10 mainly includes a lever support shaft 12 and a brake rotational shaft 14 protruding outward from an outer side surface of the cushion frame 2a in the seat width direction, an operation lever 30 rotatably attached to the outer side surface of the cushion frame 2a via the lever support shaft 12 and operating the cushion frame 2a to move up or down, and the brake unit 20 rotatably attached to the outer side surface of the cushion frame 2a via the brake rotational shaft 14 and restricts the up/down movement of the cushion frame 2a.

The lever support shaft 12 is attached to the outer side surface of the cushion frame 2a in the seat width direction via an inverted-U-shaped attachment bracket 13, protrudes outward in the seat width direction to penetrate the side cover 40, and is coupled to the operation lever 30.

The brake rotational shaft 14 is attached to the outer side surface of the cushion frame 2a to penetrate the outer side surface thereof in the seat width direction. The brake unit 20 is attached to a portion of the brake rotational shaft 14 protruding outward in the seat width direction, and the drive link (not shown) is coupled to a portion of the brake rotational shaft 14 protruding inward in the seat width direction via the pinion gear (not shown).

As shown in FIGS. 2 and 3, the lever support shaft 12 and the brake rotational shaft 14 are arranged at different positions in the seat front to back direction and coupled to each other by a four-joint link mechanism.

The four-joint link mechanism will be described. A lever-side plate 15 passing through the lever support shaft 12 and a brake-side plate 16 passing through the brake rotational shaft 14 are rotatably coupled to each other by a coupling link 17 that extends in the seat front to back direction.

As shown in FIG. 3, the lever-side plate 15 is formed of a plate rotatable about the lever support shaft 12. A pair of rotation restricting portions 15a and 15b is formed in an outer edge portion of the lever-side plate 15 above the lever support shaft 12 by cutting out the outer edge portion. A link coupling shaft 18 passes through a portion of the lever-side plate 15 below the lever support shaft 12.

The brake-side plate 16 is formed of a plate rotatable about the brake rotational shaft 14, and a portion of the brake-side plate 16 around the brake rotational shaft 14 is fastened to an outer side surface of the brake unit 20 by a bolt or welded thereto. A link coupling shaft 19 passes through a portion of the brake-side plate 16 below the brake rotational shaft 14.

The coupling link 17 is formed of a plate that is longer in the seat front to back direction, a front portion of the coupling link 17 is coupled to the lever-side plate 15 via the link coupling shaft 18, and a back portion thereof is coupled to the brake-side plate 16 via the link coupling shaft 19.

As shown in FIG. 2, the link coupling shaft 18 protrudes outward in the seat width direction to penetrate the side cover 40, and is fitted into the operation lever 30.

With the above-described configuration, when the lever-side plate 15 rotates about the lever support shaft 12 from an intermediate position shown in FIGS. 2 and 3 to a predetermined position on the seat front side, the rotation restricting portion 15a abuts on an abutment portion 13a projecting from an outer side surface of the attachment bracket 13.

Likewise, when the lever-side plate 15 rotates from the intermediate position to a predetermined position on the seat back side, the rotation restricting portion 15b abuts on the abutment portion 13a of the attachment bracket 13.

Furthermore, with the above-described configuration, the brake-side plate 16 rotates via the coupling link 17 as the lever-side plate 15 rotates as described above.

The brake-side plate 16 rotates about the brake rotational shaft 14 together with the brake rotational shaft 14 and the brake unit 20, and transmits a rotational force to the drive link via the brake rotational shaft 14 and the pinion gear (not shown).

The brake unit 20 has a well-known structure that applies a resistance force against the up/down movement of the seat main body. As shown in FIGS. 2 and 3, the brake unit 20 is attached to the outer side surface of the cushion frame 2a in the seat width direction.

The brake unit 20 mainly includes a cylindrical brake main body 21 rotating about the brake rotational shaft 14 together with the brake rotational shaft 14 and the brake-side plate 16, and an attachment plate 22 coupling the brake main body 21 to the cushion frame 2a.

The brake unit 20 is arranged at a position overlapping with the operation handle 3a of the reclining device 3 to put the side cover 40 between the brake unit 20 and the operation handle 3a in the seat width direction. Furthermore, the brake unit 20 is arranged at a position overlapping with the pinion gear (not shown) and the drive link (not shown) to put the cushion frame 2a between the brake unit 20, and the pinion gear and the drive link.

The brake unit 20 and the operation lever 30 are arranged at distant positions in the seat front to back direction, so that the operation lever 30 and the operation handle 3a of the reclining device 3 are suppressed from interfering with each other. Owing to this, the ability to assemble the height device 10 and the reclining device 3 improves and the degree of freedom for arranging both the height device 10 and the reclining device 3 increases.

The operation lever 30 is a portion gripped by an occupant for operating the height device 10. As shown in FIG. 2, the operation lever 30 is attached to project outward of the side cover 40 in the seat width direction.

Figure 4A:
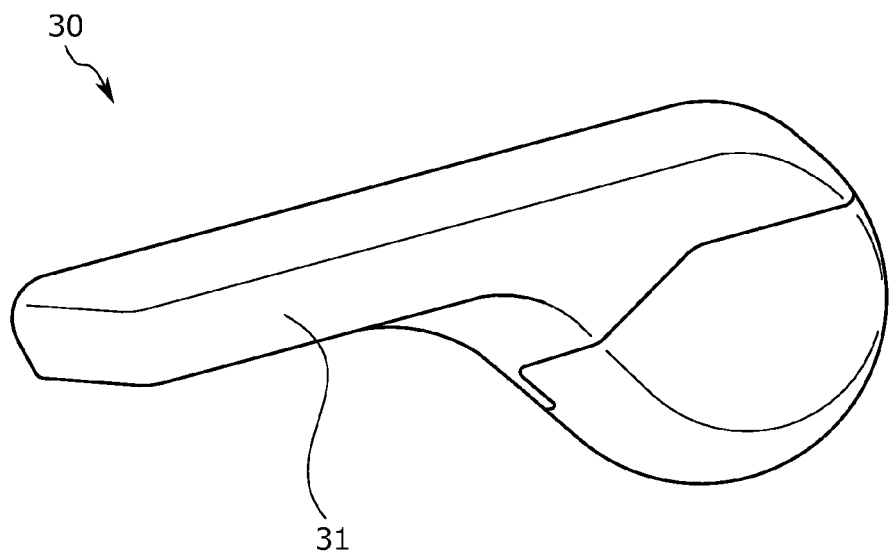
FIG. 4A is a front perspective view of an operation lever of the height device.
Figure 4B:
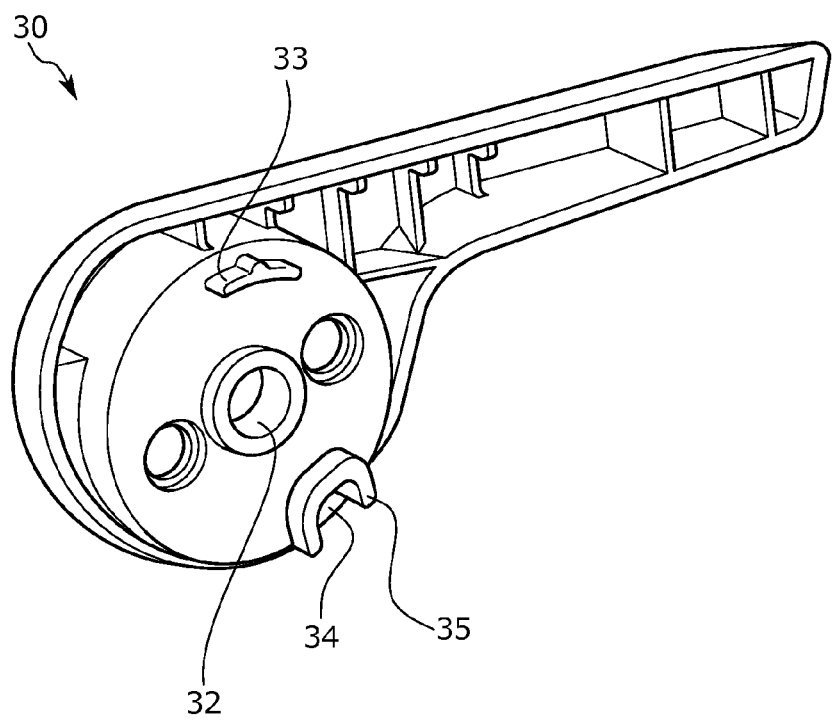
FIG. 4B is a rear perspective view of the operation lever.

As shown in FIGS. 2 and 4, the operation lever 30 is formed of a body having a longer shape in the seat front to back direction, and a front portion of the operation lever 30 is a grip portion 31 that can be gripped by the occupant.

A circular shaft hole 32 penetrating the operation lever 30 in the seat width direction is formed in a back portion of the operation lever 30, and is a hole through which the lever support shaft 12 passes.

A convex-shaped engagement protrusion 33 protruding toward the side cover 40, a fitting concave portion 34 recessed to an opposite side to the side cover 40, and a fitting convex portion 35 protruding toward the side cover 40 are formed in portions around the shaft hole 32 on an inner side surface of the operation lever 30 in the seat width direction.

The engagement protrusion 33 is arranged on an opposite side to the fitting concave portion 34 and the fitting convex portion 35 across the shaft hole 32. The engagement protrusion 33 is engaged with an engagement hole 52 provided in a positioning member 50 to be described later. The link coupling shaft 18 is fitted into the fitting concave portion 34 and the fitting convex portion 35.

As shown in FIGS. 4 and 5, the fitting convex portion 35 is formed of a U-shaped convex portion and formed to have an opening portion on an opposite side to the lever support shaft 12 side.

The fitting convex portion 35 is provided such that the fitting convex portion 35 protrudes inward in the seat width direction to penetrate the side cover 40, the link coupling shaft 18 is fitted into the fitting convex portion 35, and that the fitting convex portion 35 abuts on an outer side surface of the coupling link 17.

Figure 5A:
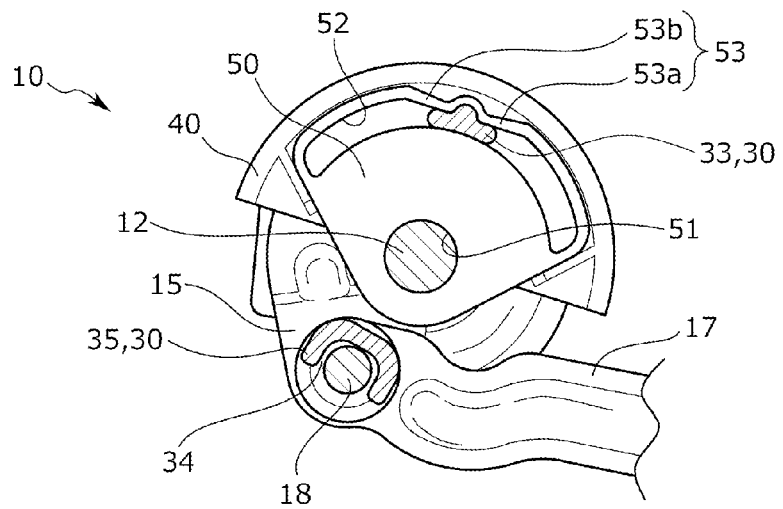
FIGS. 5A to 5C are explanatory pictorial views of a rotating operation of the operation lever relative to a positioning member and showing longitudinal sections of components around the positioning member from outside in a seat width direction.

With the above-described configuration, the operation lever 30 rotates relative to the cushion frame 2a and the lever support shaft 12 in a state in which the engagement protrusion 33 is engaged with the engagement hole 52 as shown in FIG. 5A.

By fitting the link coupling shaft 18 into the fitting concave portion 34, the lever-side plate 15 operates in an interlocked manner with the operation lever 30 when the operation lever 30 rotates about the lever support shaft 12.

As a result, an occupant's operation for rotating the operation lever 30 transmits power to the brake unit 20, the brake rotational shaft 14, and the drive link via the parallel four-joint link mechanism, so that it is possible to move the seat main body up and down.

As shown in FIG. 2, the side cover 40 is formed of a resin plate that covers the seat cushion 2 and the height device 10 from outside in the seat width direction. A circular shaft hole 41 through which the lever support shaft 12 protruding outward in the seat width direction from the cushion frame 2a-side passes is formed in a central portion of the side cover 40 in the seat front to back direction.

A semicircular containing concave portion 42 recessed to an inner side surface of the side cover 40 and a through-hole 43 penetrating the side cover 40 in a semicircular shape are formed at different positions in portions around the shaft hole 41 on the outer side surface of the side cover 40 in the seat width direction.

The positioning member 50 for positioning the operation lever 30 is contained in the containing concave portion 42, and a pair of reinforcement ribs 44 protruding toward the positioning member 50 side is formed on an outer side surface of the containing concave portion 42.

The through-hole 43 is a hole into which the link coupling shaft 18 is inserted, and formed as a relatively large semicircular hole so that the link coupling shaft 18 can rotate to correspond to the rotation of the operation lever 30 around the lever support shaft 12.

As shown in FIG. 2, the positioning member 50 is formed of a fan-shaped resin plate, arranged between the side cover 40 and the operation lever 30 in the seat width direction, contained in the containing concave portion 42 of the side cover 40 in a supported state, and attached coaxially with the operation lever 30.

A circular support hole 51 penetrating a side surface of the positioning member 50 in the seat width direction coaxially with the shaft hole 32 of the operation lever 30, and the engagement hole 52 extending along a circular arc of the shaft hole 51 are formed in the side surface of the positioning member 50 in the seat width direction.

The support hole 51 supports the lever support shaft 12 in a state of communicating with the shaft hole 32 of the operation lever 30 and the shaft hole 41 of the side cover 40.

As shown in FIGS. 2 and 5A, the engagement hole 52 is a hole engaged with the engagement protrusion 33 of the operation lever 30, and formed such that the engagement protrusion 33 can freely move in the engagement hole 52 to correspond to the rotation of the operation lever 30.

The engagement hole 52 and the engagement protrusion 33 are provided while partially abutting on each other, and the engagement protrusion 33 is configured to rotate in the engagement hole 52 while elastically deforming the engagement hole 52.

As shown in FIG. 5A, a stepped portion 53 is provided around the engagement hole 52 such that a part of the engagement hole 52 is formed narrower than the other portions thereof in a radial direction of the lever support shaft 12.

More specifically, the stepped portion 53 is provided such that a part of the engagement hole 52 is formed narrower than the engagement protrusion 33 in the radial direction of the lever support shaft 12.

The stepped portion 53 is provided around a central portion of the engagement hole 52 in an extension direction of the engagement hole 52, and includes a first stepped portion 53a and a second stepped portion 53b arranged at different positions in the extension direction.

The first stepped portion 53a and the second stepped portion 53b are formed such that a part of an outer edge of the positioning member 50 is recessed toward the lever support shaft 12 side.

Surfaces of the first stepped portion 53a and the second stepped portion 53b that abut on the engagement protrusion 33 are flat surfaces generally orthogonal to the radial direction of the lever support shaft 12.

Figure 6:
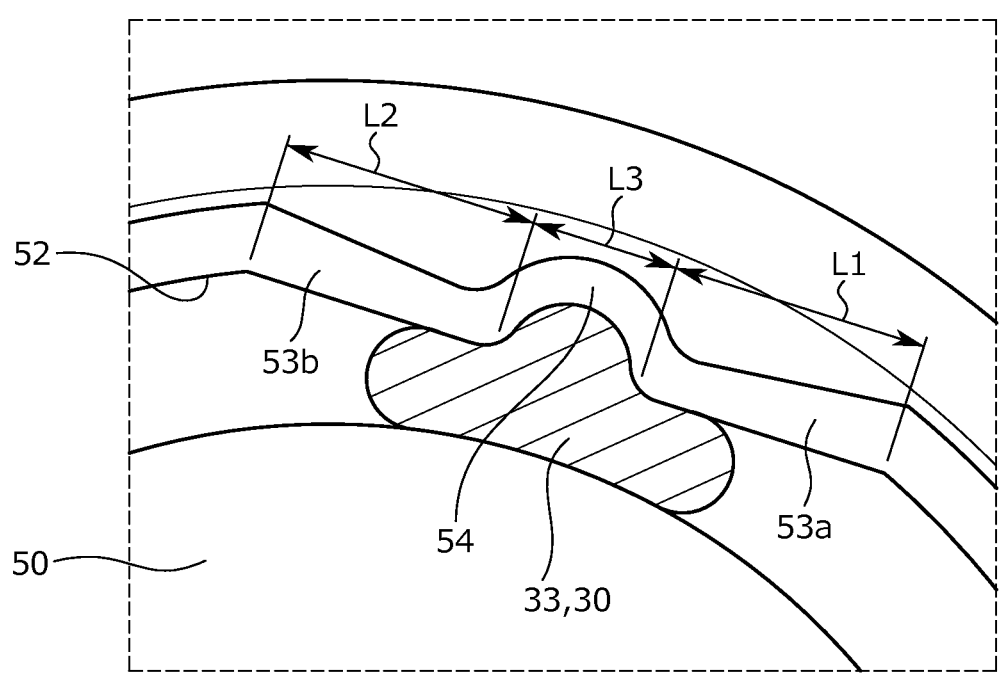
FIG. 6 is an enlarged view of principal components of FIG. 5.

As shown in FIG. 6, lengths L1 and L2 of the first stepped portion 53a and the second stepped portion 53b in the general extension direction of the engagement hole 52 are larger than a length L3 of a portion of the engagement protrusion 33 that abuts on the stepped portion 53.

Furthermore, the portions of the positioning member 50 in which the first stepped portion 53a and the second stepped portion 53b are formed are thinner as being closer to each other in the extension direction of the engagement hole 52.

A central positioning portion 54 for positioning the engagement protrusion 33 is formed between the first stepped portion 53a and the second stepped portion 53b.

The central positioning portion 54 is provided such that a part of the engagement hole 52 is wider than the portions thereof in which the first stepped portion 53a and the second stepped portion 53b are located.

More specifically, the central positioning portion 54 is provided such that a part of the engagement hole 52 is formed to be as wide as the engagement protrusion 33 in the radial direction of the lever support shaft 12.

With the above-described configuration, when the operation lever 30 is located at an intermediate position in a rotation range as shown in FIG. 5A, the engagement protrusion 33 of the operation lever 30 is put between the first stepped portion 53a and the second stepped portion 53b in the engagement hole 52 of the positioning member 50. That is, the engagement protrusion 33 is positioned to the central positioning portion 54.

Owing to this, the operation lever 30 is stably supported at the intermediate position that is a reference position.

Moreover, with the above-described configuration, the seat main body moves up when the operation lever 30 of the height device 10 is moved to an upper end position in the rotation range, and moves down when the operation lever 30 is moved to a lower end position in the rotation range.

Figure 5B:
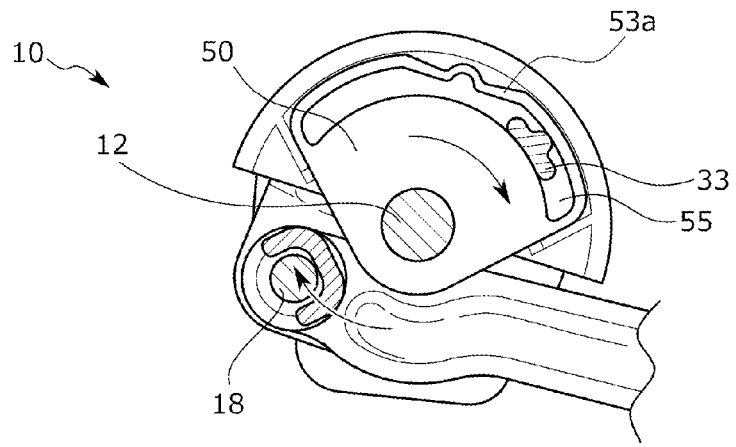

When the operation lever 30 moves to the upper end position, the engagement protrusion 33 moves to one end position shown in FIG. 5B. When the operation lever 30 moves to the lower end position, the engagement protrusion 33 moves to the other end position shown in FIG. 5C.

Figure 5C:
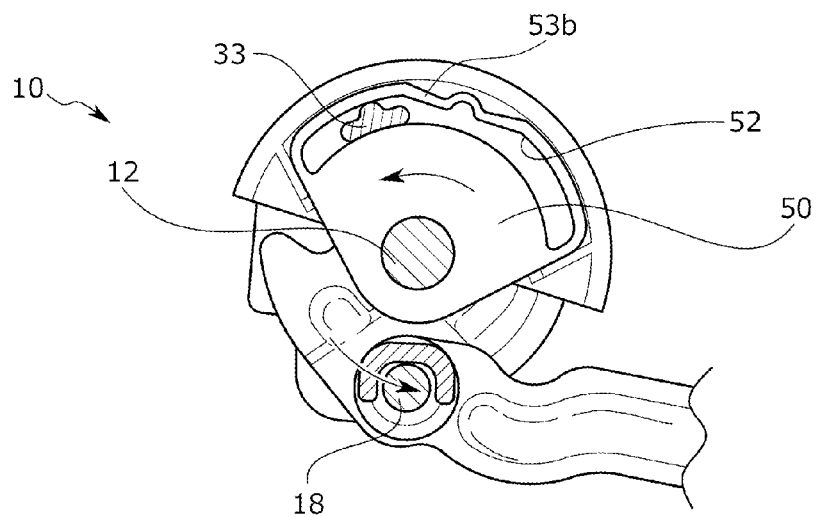

In this way, when the operation lever 30 is moved from the intermediate position in the rotation range shown in FIG. 5A to one end position shown in FIG. 5B or to the other end position shown in FIG. 5C, the engagement protrusion 33 abuts on the first stepped portion 53a or the second stepped portion 53b, thereby producing a clicking feel and improving occupant's operation feeling.

It is noted that a clearance portion 55 that enables an over-stroke is formed between the engagement protrusion 33 and an extension end portion of the engagement hole 52 when the operation lever 30 moves to one end position shown in FIG. 5B or to the other end position shown in FIG. 5C.

Other Embodiments

In the above-described embodiment, the operation lever 30 is described as the lever for operating the height device 10. However, the operation lever 30 is applicable without limiting an operation target to the height device 10. For example, the operation lever 30 is applicable as an operation lever of the seat adjustment device for adjusting a state of a seat such as the reclining device 3 or the rail device 4.

Moreover, in the above-described embodiment, the lever support shaft 12 of the operation lever 30 and the brake rotational shaft 14 of the brake unit 20 are arranged at the different positions in the seat front to back direction as shown in FIG. 2. However, the positions of the lever support shaft 12 and the brake rotational shaft 14 are not limited to these positions. The lever support shaft 12 and the brake rotational shaft 14 may be arranged coaxially or arranged at different positions in an upper to lower direction.

Furthermore, in the above-described embodiment, the engagement portion of the operation lever 30 is formed as the engagement protrusion 33, and the engagement portion of the positioning member 50 is formed as the engagement hole 52. However, these portions are not limited thereto. The engagement portion of the operation lever 30 side may be the engagement hole, and that of the positioning member 50 side may be the engagement protrusion 33. While the engagement hole 52 is formed as a through-hole penetrating the positioning member 50 in the seat width direction as shown in FIG. 2, the engagement hole 52 may be a hole recessed inward in the seat width direction.

In the above-described embodiment, the surface of the stepped portion 53 of the engagement hole 52 abutting on the engagement protrusion 33 is the flat surface generally orthogonal to the radial direction of the lever support shaft 12 as shown in FIGS. 5 and 6. However, the shape of the surface is not limited to a specific shape but can be changed.

Alternatively, the surface of the stepped portion 53 abutting on the engagement protrusion 33 may be, for example, a flat surface crossing the radial direction of the lever support shaft 12.

In another alternative, the surface of one of the first stepped portion 53a and the second stepped portion 53b abutting on the engagement protrusion may be substantially flat.

While the vehicle seat for use in an automobile has been described as a specific example in the above-described embodiments, the vehicle seat is not limited to the vehicle seat for the automobile and can be used as not only a vehicle seat for use in a train, a bus or the like but also a vehicle seat for use in an airplane, a ship or the like. Furthermore, the seat including the seat adjustment device such as the height device would be applicable to a wider range.

The vehicle seat according to the above-described embodiment is only an example for facilitating understanding the present invention and not intended to limit the present invention. The present invention can be changed or modified without departure from the concept of the present invention and encompasses equivalents to the embodiment.

In particular, the shapes, arrangements, and configurations of the height device 10, the operation lever 30, the side cover 40, and the positioning member 50 described in the embodiment are only given as an example and not intended to limit the present invention.

What is claimed is:

1. A vehicle seat comprising:
a cushion frame serving as a frame of a seating portion;
a seat adjustment device for adjusting a state of the cushion frame; and
a side cover that covers the cushion frame and the seat adjustment device from outside in a seat width direction, wherein:
the seat adjustment device comprises an operation lever that:
is attached to an outer side surface of the cushion frame in the seat width direction to be rotatable through a support shaft,
is arranged to project outward of the side cover, and operates the cushion frame,
a positioning member for positioning the operation lever is attached to an outer side surface of the side cover,
the operation lever is arranged to rotate relative to the positioning member in a state in which an engagement portion provided on an inner side surface of the operation lever is engaged with an engagement portion provided on the positioning member,
one of the engagement portions of the operation lever and the engagement portion of the positioning member is an engagement hole extending along a circular arc around the support shaft, and an other of the engagement portions is an engagement protrusion protruding toward the engagement hole and arranged to move in the engagement hole to correspond to rotation of the operation lever,
a first stepped portion and a second stepped portion are formed around the engagement hole, the first stepped portion and the second stepped portion being provided such that a part of the engagement hole is formed narrower in a radial direction of the support shaft, the first stepped portion and the second stepped portion being arranged at different positions in an extension direction of the engagement hole, and a surface of at least one of the first stepped portion and the second stepped portion that abuts on the engagement protrusion is a substantially flat surface.

2. The vehicle seat according to claim 1, wherein the first stepped portion and the second stepped portion are provided around a central portion of the engagement hole in the extension direction of the engagement hole, and surfaces of the first stepped portion and the second stepped portion that abut on the engagement protrusion are substantially flat surfaces.

3. The vehicle seat according to claim 1, wherein:

the engagement portion of the operation lever is the engagement protrusion, and the engagement protrusion is provided to rotate about the support shaft in a rotation range to correspond to the rotation of the operation lever, and positioned between the first stepped portion and the second stepped portion when being located at an intermediate position in the rotation range.

4. The vehicle seat according to claim 1, wherein surfaces of the first stepped portion and the second stepped portion that abut on the engagement protrusion are flat surfaces generally orthogonal to the radial direction of the support shaft.

5. The vehicle seat according to claim 1, wherein the first stepped portion and the second stepped portion are longer than portions of the engagement protrusion that abut on the first stepped portion and the second stepped portion in the extension direction of the engagement hole.

6. The vehicle seat according to claim 1, wherein the positioning member is fan-shaped.

7. The vehicle seat according to claim 1, wherein:

the seat adjustment device is a height device that couples the cushion frame to the vehicle body floor side so that the cushion frame is movable up and down, the support shaft is a lever support shaft, the height device comprises a brake unit that is attached to a side surface of the cushion frame to be rotatable through a brake rotational shaft, and that applies a resistance force against an up/down movement of the cushion frame, the lever support shaft and the brake rotational shaft are arranged at different positions in the seat front to back direction, and the operation lever and the brake unit are coupled to operate in a corresponding manner.

8. The vehicle seat according to claim 1, wherein:

the first stepped portion and the second stepped portion are provided such that the part of the engagement hole is narrower than the engagement protrusion in the radial direction of the support shaft, and the engagement hole:

is provided continuously between the first stepped portion and the second stepped portion, is provided such that the part of the engagement hole is formed wider than portions in which the first stepped portion and the second stepped portion are located, and comprises a central positioning portion positioning the engagement protrusion.

9. The vehicle seat according to claim 8, wherein the portions of the positioning member in which the first stepped portion and the second stepped portion are formed are thinner as being closer to the central positioning portion side in the extension direction of the engagement hole.

* * * * *